(12) United States Patent
Edly

(10) Patent No.: US 11,083,194 B2
(45) Date of Patent: Aug. 10, 2021

(54) GRANULAR PESTICIDE COMPOSITIONS

(71) Applicant: SYNGENTA PARTICIPATIONS AG, Basel (CH)

(72) Inventor: Kal Edly, Greensboro, NC (US)

(73) Assignee: SYNGENTA PARTICIPATIONS AG, Basel (CH)

( * ) Notice: Subject to any disclaimer, the term of this patent is extended or adjusted under 35 U.S.C. 154(b) by 0 days.

(21) Appl. No.: 16/312,850

(22) PCT Filed: Jun. 29, 2017

(86) PCT No.: PCT/EP2017/066112
§ 371 (c)(1),
(2) Date: Dec. 21, 2018

(87) PCT Pub. No.: WO2018/002211
PCT Pub. Date: Jan. 4, 2018

(65) Prior Publication Data
US 2019/0208773 A1 Jul. 11, 2019

(30) Foreign Application Priority Data
Jun. 30, 2016 (GB) ..................................... 1611424

(51) Int. Cl.
*A01N 25/12* (2006.01)
*A01N 53/00* (2006.01)
*A01N 25/30* (2006.01)

(52) U.S. Cl.
CPC .............. *A01N 25/12* (2013.01); *A01N 53/00* (2013.01); *A01N 25/30* (2013.01)

(58) Field of Classification Search
CPC ......... A01N 25/12; A01N 53/00; A01N 25/30
See application file for complete search history.

(56) References Cited

U.S. PATENT DOCUMENTS

| 5,705,193 | A | 1/1998 | Bourgogne |
| 5,843,203 | A | 12/1998 | Lindsay |
| 2007/0003587 | A1 | 1/2007 | Hoshina |
| 2009/0062120 | A1* | 3/2009 | Sowa ..................... A01N 25/02 504/105 |
| 2009/0263437 | A1 | 10/2009 | Talmor |

FOREIGN PATENT DOCUMENTS

| WO | 9008467 A1 | 8/1990 |
| WO | 1994015468 A1 | 7/1994 |
| WO | 9515081 A1 | 6/1995 |

OTHER PUBLICATIONS

Preliminary Examination Report for Great Britain Application No. 1611424.1 dated Feb. 24, 2017.
Combined Search and Examination Report for Great Britain 1611424.1 dated Feb. 24, 2017.
International Search Report for PCT/EP2017/066112 dated Aug. 1, 2017.
Arizona Landscape Contractors Association, Pesticidal Formulations; Chapter 4, pp. 1-20.

* cited by examiner

*Primary Examiner* — Robert A Wax
*Assistant Examiner* — Olga V. Tcherkasskaya
(74) *Attorney, Agent, or Firm* — Bakerhostetler; Toni-Junell Herbert

(57) ABSTRACT

The present invention provides granular compositions containing soil-applied pesticides. In particular, the present invention provides granular compositions containing insecticides, especially soil-applied insecticides, and more specifically still, certain pyrethroid insecticides, such as tefluthrin. The present invention provides also the use of the granular compositions for controlling insects, and methods of controlling insects by application of the granular compositions.

22 Claims, 2 Drawing Sheets

GRANULAR PESTICIDE COMPOSITIONS

CROSS-REFERENCE TO RELATED APPLICATIONS

Figure 1:
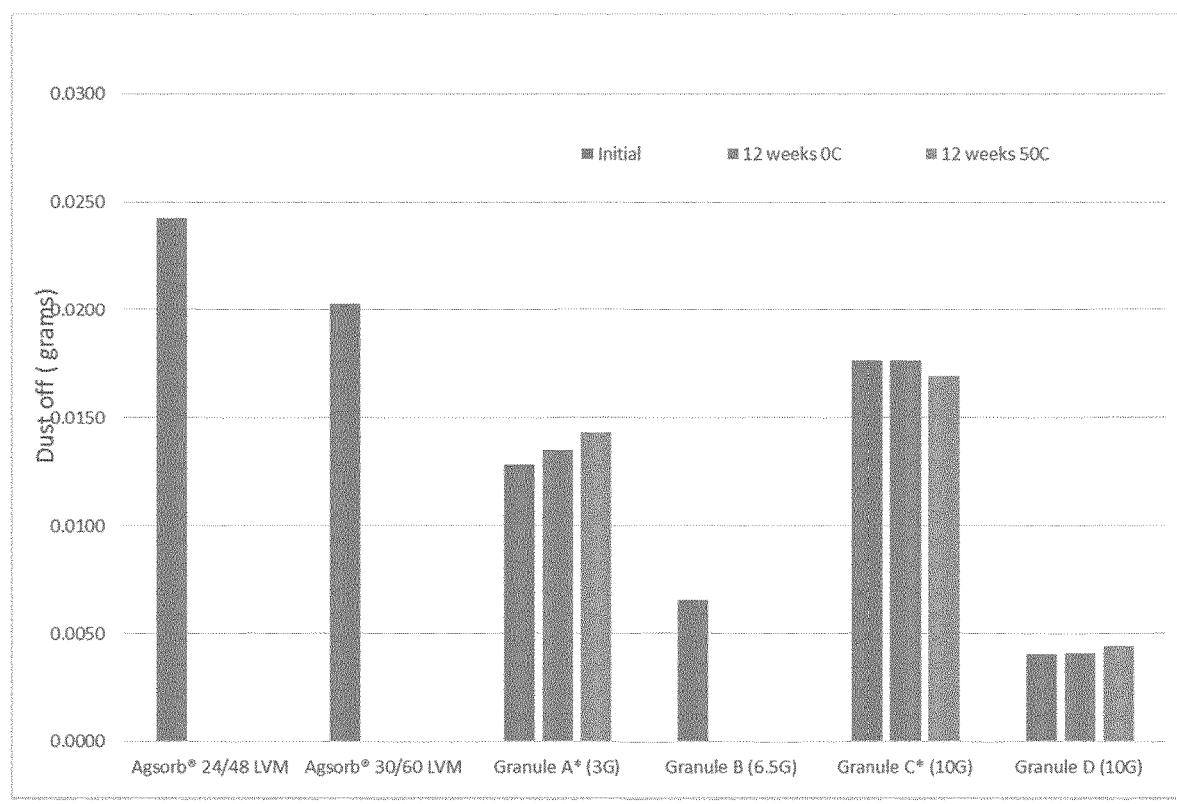

This application is a 371 National Stage application of International Application No. PCT/EP2017/066112, filed Jun. 29, 2017, which claims priority to Great Britain Application No. 1611424.1 filed Jun. 30, 2016, the entire contents of which applications are hereby incorporated by reference.

The present invention relates to granular compositions containing soil-applied pesticides. In particular, the invention relates to granular compositions containing insecticides, especially soil-applied insecticides, and more specifically still, certain pyrethroid insecticides, such as tefluthrin. The invention also relates to the use of the granular compositions for controlling insects, and methods of controlling insects by application of the granular compositions.

The pyrethroid insecticides ("pyrethroids") are a well-known class of insecticides and include, for example, permethrin, cypermethrin, zeta-cypermethrin, fenvalerate, esfenvalerate, deltamethrin, cyhalothrin, lambda-cyhalothrin, gamma-cyhalothrin, bifenthrin, fenpropathrin, cyfluthrin, beta-cyfluthrin, tefluthrin, ethofenprox, natural pyrethrin, tetramethrin, s-bioallethrin, fenfluthrin, prallethrin and 5-benzyl-3-furylmethyl-(E)-(1R,3S)-2,2-dimethyl-3-(2-oxothiolan-3-ylidene-methyl)cyclopropane carboxylate.

Most of the pyrethroids are applied as foliar or aerosol spray applications. However, certain pyrethroids have utility as soil-applied insecticides. One such pyrethroid, which is particularly useful as a soil-applied insecticide, is tefluthrin [chemical name: (2,3,5,6-tetrafluoro-4-methylphenyl)methyl-(1α,3α)-(Z)-(±)-3-(2-chloro-3,3,3-trifluoro-1-propenyl)-2,2-dimethylcyclopropanecarboxylate].

Tefluthrin is useful in the control of, inter alia, rootworms (e.g. corn rootworm), cutworms (e.g. black cutworm), wireworms and seedcorn maggots.

For use in soil, tefluthrin has been formulated in granular compositions.

Certain granular compositions comprising tefluthrin are described in WO 94/15468. Granular compositions comprising tefluthrin are also commercially available as "Force® 3.0G" (granules with 3.0% tefluthrin loading; tefluthrin 30 g/kg) or "Force® 1.5 G" (granules with 1.5% tefluthrin loading; tefluthrin 15 g/kg) or "Force® 0.5 G" (granules with 0.5% tefluthrin loading; tefluthrin 5 g/kg).

Typical granule formulations comprise an active ingredient which is absorbed onto a granular carrier, typically comprised of cellulose, compressed wood, or clays which include, inter alia, attapulgite, montmorillonite, kaolin, or bentonite type clays. The carrier granule is then treated with a spray solution containing the active ingredient in order to coat the granules. This process frequently involves the use of a solvent in order to aid in dissolving solid active ingredients, which prevents crystallization of the active ingredient and aids in application and penetration of the spray solution by reducing viscosity. Such granule formulations typically contain relatively low concentrations of the active ingredient. This has the disadvantage that, as a result of the low active ingredient concentrations, a large amount of formulated material must be handled in order to achieve biological efficacy against target pests when treating large surface areas (such as those typical in farming applications).

Additionally, frequent handling of the granule formulations, including manufacturing, processing, shipping and their use, is known to degrade granules in a process commonly known as granular attrition. Attrition of the granules leads to the generation of fine particles which may "dust off" and expose the operator to the absorbed pesticidal substances.

Thus, there remains a need for the development of new granular compositions for soil-applied pesticides, especially soil-applied insecticides such as tefluthrin, which have reduced "dust off" (thereby reducing operator exposure) whilst maintaining or improving upon their utility in terms of biological efficacy and convenience (e.g. optimally carrying higher concentrations of the active ingredient whilst retaining their favourable dust off properties).

It has now surprisingly been found that certain novel granular compositions for soil-applied pesticides have favourable dust off properties and, advantageously, are capable of carrying higher concentrations of the active ingredient whilst retaining their favourable dust off properties.

The present invention therefore provides a granular soil-applied insecticide composition comprising:
a) from 6 to 12 weight percent of an insecticide,
b) from 7 to 18 weight percent of a mixture of aromatic hydrocarbons,
c) from 0 to 5 weight percent of a surfactant system, and
d) the remainder comprising a granular support
wherein the weight ratio of [components a), b) and c) combined]:[component d)] is in the range 1.7:10 to 4:10, and wherein the weight ratio of [component a)]:[components a), b) and c) combined] is in the range 3.5:10 to 5.2:10.

In a second aspect the present invention provides the use of a composition as described herein to control insect pests.

In a further aspect the present invention provides a method of controlling insects, comprising applying a composition as described herein to the locus of said insects, in particular to the soil for the growth of plants susceptible to attack by insects.

The granular compositions of this invention can be prepared by the dissolving the insecticide (preferably tefluthrin) in the mixture of aromatic hydrocarbons [and adding the optional surfactant system to this liquid when present] and then spraying the resulting liquid onto the granular support.

In the granular compositions according to the invention the insecticide is preferably tefluthrin.

Preferably tefluthrin is present in the granular compositions according to the invention in the range of from 6.3 to 10.2 weight percent.

In one group of preferred granular compositions tefluthrin is present in the range of from 6.3 to 6.7 weight percent.

In another group of preferred granular compositions tefluthrin is present in the range of from 9.8 to 10.2 weight percent.

The term "mixture of aromatic hydrocarbons" as used herein refers to a C8-C16 aromatic hydrocarbon solvent, preferably a C9-C11 aromatic hydrocarbon solvent, and most preferably a C9-C10 aromatic hydrocarbon solvent.

Examples of suitable solvents include but are not limited to mixtures of aromatic hydrocarbons such as "AROMATIC 150" ("Solvesso™ 150" Fluid; CAS No.: 64742-94-5; from ExxonMobil Chemical), "Solvesso 150 ND" (CAS No.: 64742-94-5; from ExxonMobil Chemical), Hydrosol A200 ND (CAS No.: 64742-94-5; DHC—Düsseldorf), ShellSol A150 ND (CAS No.: 64742-94-5; Shell Chemicals), Aromat K 150 ULN (Klink KG), "Aromatic 100" ("Solvesso™ 100" Fluid; CAS No.: 64742-95-6; from ExxonMobil Chemical), and "Aromatic 200" ("Solvesso™ 200" Fluid; CAS No.: 64742-94-5; from ExxonMobil Chemical).

Further details for certain solvents available from ExxonMobil Chemical are provided below.

| Solvent name | Distillation Range, Initial Boiling Point (IBP) (° C.) | Distillation Range, Dry Point (DP) (° C.) | Flash Point (° C.) |
| --- | --- | --- | --- |
| Solvesso ™ 100 | 165 | 181 | 50 |
| Solvesso ™ 150 | 180 | 205 | 65 |
| Solvesso ™ 150 ND | 180 | 193 | 64 |
| Solvesso ™ 200 | 237 | | 105 |

The term "surfactant system" as used herein means any agrochemically acceptable surfactant system that enables release of the active ingredient from the granular support. The surfactant system may comprise one or more surfactants. Preferably the surfactant system is an emulsifying surfactant system. The surfactants may be non-ionic, anionic, cationic or Zwitterionic. Examples of particular suitable surfactants include but are not limited to alkyl polyglycosides, polyalkylene oxide block copolymers and polyaryl-phenyl ether phosphates.

Alkyl polyglycosides include Agnique® PG ("APG") 8107 (Cognis Corporation, Cincinnati, Ohio, USA) (an alkyl polyglycoside in which the alkyl group contains 8 to 10 carbon atoms and has an average degree of polymerization of 1.7), Agnique® PG 9116 (Cognis Corporation, Cincinnati, Ohio, USA) (an alkyl polyglycoside in which the alkyl group contains 9 to 11 carbon atoms and has an average degree of polymerization of 1.6) and Agnique® PG 8105 (Cognis Corporation, Cincinnati, Ohio, USA) (an alkyl polyglycoside in which the alkyl group contains 8 to 10 carbon atoms and has an average degree of polymerization of 1.5).

Polyalkylene oxide block copolymers can be di- and tri-block copolymers, such as ABA or BAB block copolymer or BA block copolymers. Examples include the Genapol® PF series (Clariant), the Pluronic® series (BASF), the Synperonic® PE series (Uniqema), and the Toximul® series (Stepan Chemical Co.). A preferred group of ethylene oxide/propylene oxide block copolymers for use in the compositions of this invention are butyl based poly(oxypropylene)/poly(oxyethylene)block copolymers having an average molecular weight in the range of 2400 Da to 3500 Da, for example Toximul® 8320 (Stepan Chemical Co.; CAS No.: 9038-95-3). Suitable examples include Pluronic® L10, Pluronic® L44, Pluronic® L63, Pluronic® L64, Pluronic® L84, Pluronic® P104, Pluronic® P105, Step-Flow® 26, Toximul® 8323 and Toximul® 8320 (CAS No.: 9038-95-3).

Polyaryl-phenyl ether phosphate include Soprophor® 3D33 (Rhodia; ethoxylated polyarylphenol phosphate ester; CAS No.: 90093-37-1), Rhodia Soprophor® 3D33 LN (Rhodia), Clariant Emulsogen® 57 (Clariant), BASF Agnique® PE TSP-16A (BASF), Rhodia Agrhospec® 7822 (Rhodia), Clariant Dispersogen® TP 160 (Clariant), Stepan Stepfac® TP 160 (Stepan), Stepan Stepfac® TSP-PE (Stepan). The degree of ethoxylation of the polyaryl-phenyl ether phosphates for this purpose is preferably between 8 and 20.

Other suitable anionic surfactants include Stepwet® DF-95 (sodium lauryl sulphate; CAS No. 151-21-3).

Further suitable surfactants include nonylphenol Ethoxylates (NPE), alkylphenol ethoxylates (APE), alkyl sulphates, and alkylbenzene sulfonates.

The presence of the surfactant system is optional.

When granular compositions comprise a surfactant system, a preferred surfactant system comprises a polyaryl-phenyl ether phosphate (e.g. "Soprophor® 3D33"; Rhodia; ethoxylated polyaryl-phenol phosphate ester; CAS No.: 90093-37-1) and a butyl based poly(oxypropylene)/poly(oxyethylene)block copolymer which has an average molecular weight in the range of 2400 to 3500 (e.g. "Toximul® 8320":Stepan Chemical Co.; CAS No.: 9038-95-3). A more preferred surfactant system further comprises the anionic surfactant sodium lauryl sulphate (e.g. Stepwet® DF-95; CAS No. 151-21-3) in addition. A most preferred surfactant system comprises sodium lauryl sulphate, a polyaryl-phenyl ether phosphate and a butyl based poly(oxypropylene)/poly(oxyethylene) block copolymer which has an average molecular weight in the range of 2400 Da to 3500 Da, wherein the ratio of sodium lauryl sulphate:polyaryl-phenyl ether phosphate:butyl based poly(oxypropylene)/poly(oxyethylene)block copolymer is 3:4:2.

In one group of preferred granular compositions the granules comprise a surfactant system, wherein from 2 to 4 weight percent of a surfactant system is present.

In another group of preferred granular compositions the granules comprise a surfactant system, wherein the surfactant system comprises a polyaryl-phenyl ether phosphate (e.g. "Soprophor® 3D33"; Rhodia; ethoxylated polyaryl-phenol phosphate ester; CAS No.: 90093-37-1) and a butyl based poly(oxypropylene)/poly(oxyethylene) block copolymer which has an average molecular weight in the range of 2400 Da to 3500 Da (e.g. "Toximul® 8320":Stepan Chemical Co.; CAS No.: 9038-95-3). In a more preferred embodiment of this group of compositions the surfactant system further comprises the anionic surfactant sodium lauryl sulphate (e.g. Stepwet® DF-95; CAS No. 151-21-3) in addition. In a most preferred embodiment of this group of compositions the ratio of sodium lauryl sulphate:polyaryl-phenyl ether phosphate:butyl based poly(oxypropylene)/poly(oxyethylene).block copolymer is 3:4:2.

The term "granular support" as used herein refers to granules typically used in agrochemical formulations. Examples include granules comprised of cellulose, compressed wood, or clays which include, inter alia, attapulgite, montmorillonite, kaolin, or bentonite type clays. Preferred granules are those comprised of montmorillonite-type clay. Examples include granules from the Agsorb® series (Oil-Dri Corporation of America) and granules from the "Verge® S" (semi-dissolving montmorillonite granules), "Verge® D" (dissolving montmorillonite granules) and "Verge® N" (non-dissolving montmorillonite granules) series engineered montmorillonite granules (Oil-Dri Corporation of America).

Employing a granular support based on a smaller particle size granule allows the use of electronic metering systems for application which allow for a more precise application of the compositions (e.g. the AMVAC SmartBox® system).

Particularly preferred granular supports are "Agsorb® 30/60 LVM" (montmorillonite granules manufactured with a sieve size 30/60 and/or a particle size of 250-600 μm, and/or a median particle size of 400 μm as determined by GSA test method PS 006.01.01; Oil-Dri Corporation of America) and "Agsorb® 24/48 LVM" (montmorillonite granules manufactured with a sieve size 24/48 and/or a particle size of between 300-700 μm, and/or a median particle size of 550 μm as determined by GSA test method PS 006.01.01; Oil-Dri Corporation of America).

In one group of preferred granular compositions the granular supports is "Agsorb® 30/60 LVM" granules (granules manufactured with a sieve size 30/60 and/or a particle size of 250-600 μm, and/or a median particle size of 400 μm).

In another group of preferred granular compositions the granular supports is "Agsorb® 24/48 LVM" granules (montmorillonite granules manufactured with a sieve size 24/48 and/or a particle size of between 300-700 μm, and/or a median particle size of 550 μm).

In another group of preferred granular compositions the granular supports is "Verge® S100" semi-dissolving montmorillonite granules with a size guide number (SGN) of 100 and/or a median granule size of 1 mm ("Verge® S" series engineered montmorillonite granules from Oil-Dri Corporation of America).

The weight ratio of the spray liquid:solid granular support is important for the granular compositions according to the invention. Thus, it is necessary that the weight ratio of [components a), b) and c) combined]:[component d)] is in the range 1.7:10 to 4:10. Preferably the weight ratio of [components a), b) and c) combined]:[component d)] is in the range 1.8:10 to 3.8:10.

In one group of preferred granular compositions the weight ratio of [components a), b) and c) combined]:[component d)] is in the range 1.8:10 to 2.2:10.

In another group of preferred granular compositions the weight ratio of [components a), b) and c) combined]:[component d)] is in the range 2.5:10 to 2.9:10.

In another group of preferred granular compositions the weight ratio of [components a), b) and c) combined]:[component d)] is in the range 3.1:10 to 3.8:10.

The concentration of insecticide (preferably tefluthrin) in the spray liquid is important for granular compositions according to the invention. Thus, it is necessary that the weight ratio of [component a)]:[components a), b) and c) combined] is in the range 3.5:10 to 5.2:10.

Preferably the weight ratio of [component a)]:[components a), b) and c) combined] is in the range 3.6:10 to 5:10.

In one group of preferred granular compositions the weight ratio of [component a)]:[components a), b) and c) combined] is in the range 3.6:10 to 4.2:10.

In another group of preferred granular compositions the weight ratio of [component a)]:[components a), b) and c) combined] is in the range 4.6:10 to 5:10.

The weight ratio of the insecticide (preferably tefluthrin): the mixture of aromatic hydrocarbons is important for certain particularly preferred granular compositions according to the invention. Thus, in these particular particularly preferred granular compositions it is preferred that the weight ratio of [component a)]:[component b)] is in the range 6:10 to 7:10.

In one group of these particularly preferred granular compositions the weight ratio of [component a)]:[component b)] is in the range 6.2:10 to 6.8:10.

In another group of preferred granular compositions the weight ratio of [component a)]:[component b)] is in the range 6.3:10 to 6.7:10.

In another group of preferred granular compositions the weight ratio of [component a)]:[component b)] is in the range 6.4:10 to 6.6:10.

Embodiments according to the invention are provided as set out below.

Embodiment 1 provides a granular soil-applied insecticide composition comprising:

a) from 6 to 12 weight percent of an insecticide, b) from 7 to 18 weight percent of a mixture of aromatic hydrocarbons, c) from 0 to 5 weight percent of a surfactant system, and d) the remainder comprising a granular support wherein the weight ratio of [components a), b) and c) combined]:[component d)] is in the range 1.7:10 to 4:10, and wherein the weight ratio of [component a)]:[components a), b) and c) combined] is in the range 3.5:10 to 5.2:10.

Embodiment 2 provides a granular composition according to embodiment 1 wherein the insecticide is tefluthrin.

Embodiment 3 provides a granular composition according to embodiment 1 or 2 wherein the insecticide is present in the range of from 6.3 to 10.2 weight percent.

Embodiment 4 provides a granular composition according to any one of embodiments 1, 2 or 3 wherein the mixture of aromatic hydrocarbons is a C8-C16 aromatic hydrocarbon solvent, preferably a C9-C11 aromatic hydrocarbon solvent, and most preferably a C9-C10 aromatic hydrocarbon solvent.

Embodiment 5 provides a granular composition according to any one of embodiments 1, 2, 3 or 4 wherein the granular support is selected from granules comprised of cellulose, compressed wood, or clay granules selected from attapulgite, montmorillonite, kaolin, or bentonite type clays.

Embodiment 6 provides a granular composition according to any one of embodiments 1, 2, 3, 4, or 5 wherein the weight ratio of [components a), b) and c) combined]:[component d)] is in the range 1.8:10 to 3.8:10.

Embodiment 7 provides a granular composition according to any one of embodiments 1, 2, 3, 4, 5, or 6 wherein the weight ratio of [component a)]:[components a), b) and c) combined] is in the range 3.6:10 to 5:10.

Embodiment 8 provides a granular composition according to any one of embodiments 1, 2, 3, 4, 5, 6, or 7 wherein the granular support is granules comprised of montmorillonite-type clay.

Embodiment 9 provides a granular composition according to any one of embodiments 1, 2, 3, 4, 5, 6, 7, or 8 wherein the granular support is "Agsorb® 30/60 LVM" granules (montmorillonite granules with a particle size of 250-600 μm, and a median particle size of 400 μm as determined by GSA test method PS 006.01.01) or "Agsorb® 24/48 LVM" (montmorillonite granules with a particle size of between 300-700 μm, and a median particle size of 550 μm as determined by GSA test method PS 006.01.01).

Embodiment 10 provides a granular composition according to any one of embodiments 2, 3, 4, 5, 6, 7, 8, or 9 wherein tefluthrin is present in the range of from 6.3 to 6.7 weight percent.

Embodiment 11 provides a granular composition according to any one of embodiments 2, 3, 4, 5, 6, 7, 8, or 9 wherein tefluthrin is present in the range of from 9.8 to 10.2 weight percent.

Embodiment 12 provides a granular composition according to any one of embodiments 1, 2, 3, 4, 5, 6, 7, 8, 9 or 10 wherein the weight ratio of [components a), b) and c) combined]:[component d)] is in the range 1.8:10 to 2.2:10.

Embodiment 13 provides a granular composition according to any one of embodiments 1, 2, 3, 4, 5, 6, 7, 8, 9 or 11 wherein the weight ratio of [components a), b) and c) combined]:[component d)] is in the range 2.5:10 to 2.9:10.

Embodiment 14 provides a granular composition according to any one of embodiments 1, 2, 3, 4, 5, 6, 7, 8, 9 or 11, wherein the weight ratio of [components a), b) and c) combined]:[component d)] is in the range 3.1:10 to 3.8:10.

Embodiment 15 provides a granular composition according to any one of embodiments 1, 2, 3, 4, 5, 6, 7, 8, 9, 10, 11, 12, 13 or 14 wherein the weight ratio of [component a)]:[components a), b) and c) combined] is in the range 3.6:10 to 4.2:10.

Embodiment 16 provides a granular composition according to any one of embodiments 1, 2, 3, 4, 5, 6, 7, 8, 9, 10, 11, 12, 13 or 14 wherein the weight ratio of [component a)]:[components a), b) and c) combined] is in the range 4.6:10 to 5:10.

Embodiment 17 provides a granular composition according to any one of embodiments 1, 2, 3, 4, 5, 6, 7, 8, 9, 10, 11, 12, 13, 14, 15 or 16 wherein the granular compositions comprise from 2 to 4 weight percent of a surfactant system.

Embodiment 18 provides a granular composition according to any one of embodiments 1, 2, 3, 4, 5, 6, 7, 8, 9, 10, 11, 12, 13, 14, 15, 16 or 17 wherein the granules comprise a surfactant system, and the surfactant system comprises a polyaryl-phenyl ether phosphate and a butyl based poly(oxypropylene)/poly(oxyethylene)block copolymer which has an average molecular weight in the range of 2400 Da to 3500 Da.

Embodiment 19 provides a granular composition according to embodiment 18 wherein the surfactant system further comprises the anionic surfactant sodium lauryl sulphate, preferably wherein the ratio of sodium lauryl sulphate:polyaryl-phenyl ether phosphate:butyl based poly(oxypropylene)/poly(oxyethylene)block copolymer is 3:4:2.

Embodiment 20 provides a granular composition according to any one of embodiments 1, 2, 3, 4, 5, 6, 7, 8, 9, 10, 11, 12, 14, 15, 16 or 17 wherein the weight ratio of [component a)]:[component b)] is in the range 6:10 to 7:10.

Embodiment 21 provides a granular composition according to any one of embodiments 1, 2, 3, 4, 5, 6, 7, 8, 9, 10, 11, 12, 14, 15, 16, 17 or 20 wherein the weight ratio of [component a)]:[component b)] is in the range 6.2:10 to 6.8:10.

Embodiment 22 provides a granular composition according to any one of embodiments 1, 2, 3, 4, 5, 6, 7, 8, 9, 10, 11, 12, 14, 15, 16, 17, 20 or 21 wherein the weight ratio of [component a)]:[component b)] is in the range 6.3:10 to 6.7:10.

Embodiment 23 provides a granular composition according to any one of embodiments 1, 2, 3, 4, 5, 6, 7, 8, 9, 10, 11, 12, 14, 15, 16, 17, 20, 21 or 22 wherein the weight ratio of [component a)]:[component b)] is in the range 6.4:10 to 6.6:10. In one preferred group of granular compositions according to invention the composition comprises:
   a) from 6.3 to 6.7 weight percent of tefluthrin,
   b) from 8 to 12 weight percent of a mixture of aromatic hydrocarbons,
   c) from 0 to 5 weight percent of an optional surfactant system, and
   d) the remainder comprising a montmorillonite-type clay granular support
wherein the weight ratio of [components a), b) and c) combined]:[component d)] is in the range 1.8:10 to 2.2:10, the weight ratio of [component a)]:[components a), b) and c) combined] is in the range 3.6:10 to 4.2:10, and wherein the weight ratio of [component a)]:[component b)] is in the range 6.3:10 to 6.7:10.

In this particular preferred group of granular compositions it is preferred that the composition comprises:
   a) from 6.3 to 6.7 weight percent of tefluthrin,
   b) from 9 to 11 weight percent of a mixture of aromatic hydrocarbons (preferably C9-C10 aromatic hydrocarbon solvent "AROMATIC 150"; CAS no.: 64742-94-5), and
   c) the remainder comprising a montmorillonite-type clay granular support (preferably "Agsorb® 30/60 LVM" montmorillonite granules; CAS no. 1302-78-9).

In another preferred group of granular compositions according to the invention the composition comprises:
   a) from 9.8 to 10.2 weight percent of tefluthrin,
   b) from 13 to 18 weight percent of a mixture of aromatic hydrocarbons,
   c) from 0 to 5 weight percent of an optional surfactant system, and
   d) the remainder comprising a montmorillonite-type clay granular support
wherein the weight ratio of [components a), b) and c) combined]:[component d)] is in the range 3.1:10 to 3.8:10, the weight ratio of [component a)]:[components a), b) and c) combined] is in the range 3.6:10 to 4.2:10, and wherein the weight ratio of [component a)]:[component b)] is in the range 6.3:10 to 6.7:10.

In this particular preferred group of granular compositions it is preferred that the composition comprises:
   a) from 9.8 to 10.2 weight percent of tefluthrin,
   b) from 14 to 17 weight percent of a mixture of aromatic hydrocarbons (preferably C9-C10 aromatic hydrocarbon solvent "AROMATIC 150"; CAS no.: 64742-94-5), and
   c) the remainder comprising a montmorillonite-type clay granular support (preferably "Agsorb® 30/60 LVM" montmorillonite granules; CAS no. 1302-78-9).

In another preferred group of granular compositions according to the invention the composition comprises:
   a) from 9.8 to 10.2 weight percent of tefluthrin,
   b) from 7 to 10 weight percent of a mixture of aromatic hydrocarbons,
   c) from 2 to 4 weight percent of a surfactant system which comprises a polyaryl-phenyl ether phosphate, a butyl based poly(oxypropylene)/poly(oxyethylene)block copolymer which has an average molecular weight in the range of 2400 Da to 3500 Da, and sodium lauryl sulphate, and
   d) the remainder comprising a montmorillonite-type clay granular support
wherein the weight ratio of [components a), b) and c) combined]:[component d)] is in the range 2.5:10 to 2.9:10, and wherein the weight ratio of [component a)]:[components a), b) and c) combined] is in the range 4.6:10 to 5:10.

Certain particularly preferred granular compositions are described below:

| | Component | CAS No.: | Weight percentage |
|---|---|---|---|
| a) | Tefluthrin | 79538-32-2 | 6.5% w/w |
| b) | C9-C10 aromatic hydrocarbon solvent ("AROMATIC 150") | 64742-94-5 | 10.07% w/w |
| d) | "Agsorb ® 30/60 LVM" montmorillonite granules | 1302-78-9 | 83.43% w/w |
| a) | Tefluthrin | 79538-32-2 | 10% w/w |
| b) | C9-C10 aromatic hydrocarbon solvent ("AROMATIC 150") | 64742-94-5 | 15.5% w/w |
| d) | "Agsorb ® 30/60 LVM" montmorillonite granules | 1302-78-9 | 74.5% w/w |
| a) | Tefluthrin | 79538-32-2 | 10% w/w |
| b) | C9-C10 aromatic hydrocarbon solvent ("AROMATIC 150") | 64742-94-5 | 8% w/w |
| c) | Polyaryl-phenyl ether phosphate (Soprophor ® 3D33) | 90093-37-1 | 1.33% w/w |
| | Copolymer butanol PO/EO (Toximul ® 8320) | 9038-95-3 | 0.67% w/w |
| | dodecyl sulfate sodium salt (Stepwet ® DF-95) | 151-21-3 | 1% w/w |
| d) | "Verge ® S100" series engineered montmorillonite granules (Oil-Dri Corporation of America). | 1302-78-9 | 79% w/w |

Granular compositions according to the invention may possess any number of benefits including, inter alia, advantageous levels of biological efficacy for protecting plants from pests (e.g. from insects) or superior properties for use as agrochemical active ingredient compositions; for example, an improved safety profile (e.g. reduced "dust off", reduced active ingredient crystallization on the granular support, etc), improved physico-chemical properties, improved storage-stability, improved handling properties (e.g. reduced odours, improved safety and logistical aspects due to higher active ingredient loading, etc) or improved properties for agrochemical applications (e.g. release from carrier granule, etc).

Preparation of the Granular Compositions According to the Invention

The granular compositions according to the invention are prepared by the following general procedure: the required amount of tefluthrin and the required amount of surfactant system (if present) are added to the required amount of the aromatic hydrocarbon solvent to form a solution. That resulting solution is then sprayed or aspirated onto the required amount of granular support in a mixer to produce the supported granular composition.

In an alternative process, the required amount of tefluthrin and the required amount of a surfactant system are added to the required amount of the aromatic hydrocarbon solvent to form a solution. The resulting solution is then sprayed or aspirated onto the required amount of granular support in a mixer to produce the supported granular composition. Optionally, a dry surfactant, such as Stepwet® DF-95 (dodecyl sulfate sodium salt), may be applied after the liquid portion is partially absorbed onto the granular surface but prior to complete absorption of the liquid which results in a coating of the granular material comprised of the final surfactant addition.

The skilled person will appreciate that in preparing the granular compositions the spray solution may be applied at a controlled rate based on spray solution assay, for example with the granular support (e.g. a clay, such as a montmorillonite type-clay) being added simultaneously in measured aliquots into the mixer in a continuous process.

The equipment used to prepare the granular compositions is that typical and standard in the art, e.g. the process may involve the use of a continuous v-blender which loads the granular support (e.g. a clay, such as a montmorillonite type-clay) and performs the spray operation and blending simultaneously. Following which the granular material may then transferred to an orbital shaker equipped with an appropriately sized mesh screen and dust collection system to remove any fine or oversized material prior to packing and/or storing the granules.

Methods of Using the Granular Compositions

Soil-applied pesticides (e.g. insecticides, such as tefluthrin) when applied as granular compositions are typically applied at the time of planting, via banded, T-banded, or in-furrow application methods to the soil at the base of the target crop (e.g. corn).

Application of the granular compositions is typically performed via a metered applicator tube or a granular dispensing unit which places the granular composition between the furrow openers and press wheels but may also use tines, closing wheels or another suitable method so as to incorporate the granular composition within the top three centimetres (~an "inch") of the soil by the aforementioned methods.

Accurate metering of the formulation delivers the specified application rate and may be performed electronically or mechanically.

Suitable application equipment includes systems such as the AMVAC SmartBox® system. Other suitable application systems include those made by Allis Chalmers, International Harvester, Noble, White, Gandy, Kinze or John Deere. Many others are also suitable.

EXPERIMENTAL

Granular Composition Preparation:

The "control" granules (i.e. granules 1 and 2) are commercially available granular supports without any solvent, active ingredient or surfactants and were purchased from Oil-Dri Corporation of America.

The agrochemical granular compositions (granules 3, 4, 5 and 6) were prepared by the procedures described above using the same commercially available granular supports, technical grade tefluthrin (94.0% purity, unless indicated), a surfactant system (if present) and the indicated amount of solvent (either an aromatic hydrocarbon solvent or a fatty acid methylester).

The following granules were prepared and tested for "dust off":

1. Agsorb® 24/48 LVM (control):

Commercially available montmorillonite granules with a particle size of between 300-700 μm, and a median particle size of 550 μm as determined by GSA test method PS 006.01.01. (Oil-Dri Corporation of America).

2. Agsorb® 30/60 LVM (control):

Commercially available montmorillonite granules with a particle size of 250-600 μm, and a median particle size of 400 μm as determined by GSA test method PS 006.01.01. (Oil-Dri Corporation of America)

3. Granule A* (3G):

3% w/w Tefluthrin dissolved in 7% w/w fatty acid methylester (methyl caprylate+methyl caprate in form Agnique® ME 610-U and Stepan® C-25) applied to 90% w/w of "Agsorb® 24/48 LVM" montmorillonite granules (Oil-Dri Corporation of America).

4. Granule B (6.5G):

6.5% w/w Tefluthrin dissolved in 10.07% w/w of a mixture of aromatic hydrocarbons (C9-C10 aromatic hydrocarbon solvent in form of "AROMATIC 150"; CAS No.: 64742-94-5; from ExxonMobil Chemical) applied to 83.43% w/w of "Agsorb® 30/60 LVM" montmorillonite granules (Oil-Dri Corporation of America).

5. Granule C* (10G):

10% w/w Tefluthrin dissolved in 5% w/w of a mixture of aromatic hydrocarbons (C9-C10 aromatic hydrocarbon solvent in form of "AROMATIC 150"; CAS No.: 64742-94-5; from ExxonMobil Chemical) applied to 85% w/w of "Agsorb® 30/60 LVM" montmorillonite granules (Oil-Dri Corporation of America).

6. Granule D (10G):

10% w/w Tefluthrin dissolved in 15.5% w/w of a mixture of aromatic hydrocarbons (C9-C10 aromatic hydrocarbon solvent in form of "AROMATIC 150"; CAS No.: 64742-94-5; from ExxonMobil Chemical) applied to 74.5% w/w of "Agsorb® 30/60 LVM" montmorillonite granules (Oil-Dri Corporation of America).

Measurement of "Dust Off":

Dust off testing was performed using a Heubach dustmeter, Dust Off Test Conditions:

A 100 g sample of each granule was tested in the standard procedure using a Heubach dustmeter, based on the following conditions:

20 L/min airflow;

5 minute test interval (100 L total air volume); and

30 RPM rotation speed.

Following which the sample of each granule tested was collected on a pre-weighed glass filter pad and the amount of "dust off" was determined by weighing and calculating the difference in mass of the pre-weighed filter pad and the final mass of the filter pad once testing is completed (measured to nearest 0.1 mg).

The experimental trials were run in triplicate for each granule and the "dust off" results recorded are the average of all three trials.

For each granule the average "dust off" measured is recorded in weight ("grams") in Table 1 below.

Granular compositions were tested for "dust off" content by evaluating the granular support and formulated materials at time zero (initial), as well as post storage in sealed containers at 0° C. and 50° C. for a 12 week period to determine any changes in the amount of fine material (dust) present after storage. In all cases, testing was performed in triplicate and results are reported as an average of all three trials.

TABLE 1

| | | Dust off (grams) | | |
|---|---|---|---|---|
| | | | 12 weeks | |
| Entry | Granule | Initial | 0 C. | 50 C. |
| 1. | Agsorb ® 24/48 LVM (control) | 0.0243 | Not measured | Not measured |
| 2. | Agsorb ® 30/60 LVM (control) | 0.0203 | Not measured | Not measured |
| 3. | Granule A* (3 G) | 0.0128 | 0.0135 | 0.0143 |
| 4. | Granule B (6.5 G) | 0.0065 | Not measured | Not measured |
| 5. | Granule C* (10 G) | 0.0176 | 0.0176 | 0.0169 |
| 6. | Granule D (10 G) | 0.0040 | 0.0041 | 0.0044 |

*Comparison granule (not according to the invention).

FIG. 1: Graph showing all of the "dust off" results measured for the six granules tested (Table 1).

Figure 2:
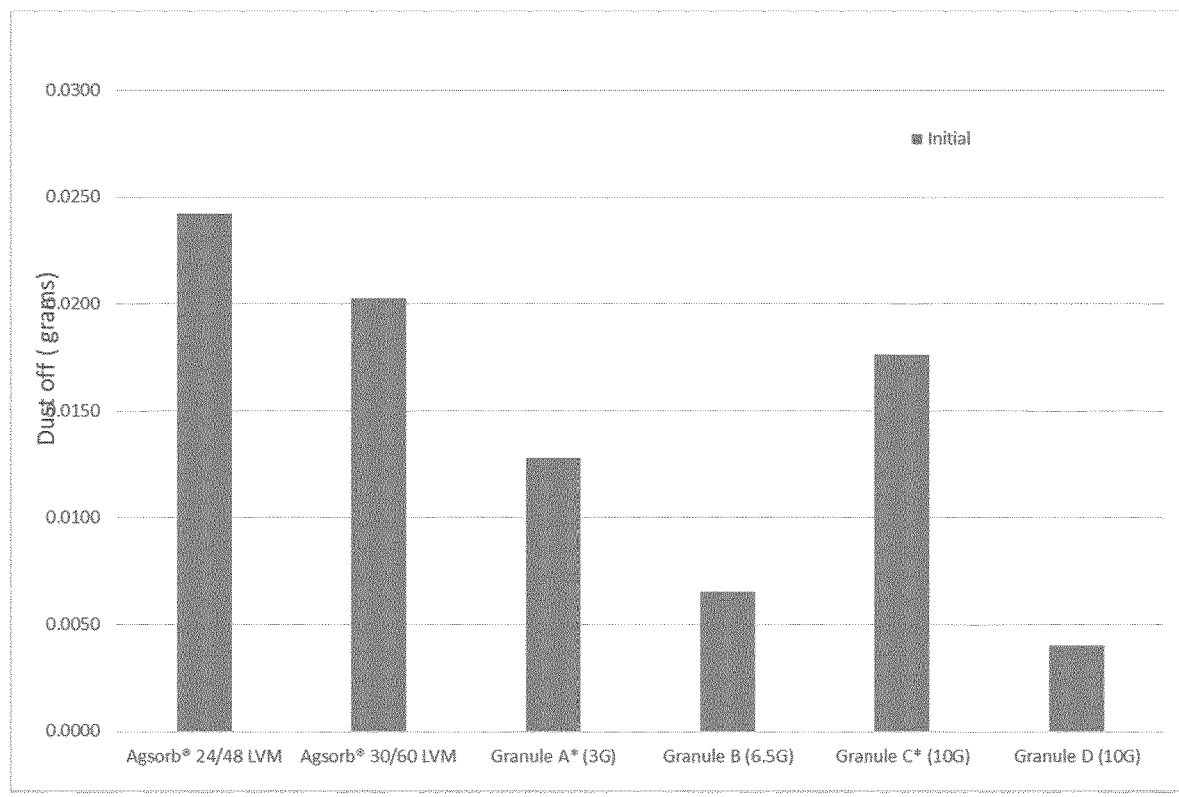

FIG. 2: Graph showing the initial "dust off" results measured for the six granules tested (Table 1).

The experimental test data shows an unexpected decrease in the amount of dust off present with the granular compositions according to the invention when compared to the base carrier granules and comparative compositions.

Storage Stability:

The storage stability of "Granule B" granules was tested and the granules were found to be storage stable at 0 deg C. and 50 deg C. for at least 12 weeks.

Biological Results:

The biological testing of "Granule B" and "Granule D" granules in both lab and field trials showed biological performance equivalent to existing commercial tefluthrin granule formulations with no negative effects on corn stand counts or vigor ratings.

The invention claimed is:

1. A granular soil-applied insecticide comprising:
   a) from 6 to 12 weight percent of tefluthrin,
   b) from 7 to 18 weight percent of a C8-C16 aromatic hydrocarbon solvent for the tefluthrin,
   c) from 0 to 5 weight percent of a surfactant system, and
   d) a granular support,
   wherein the weight ratio of [components a), b) and c) combined]:[component d)] is in the range of from 1.7:10 to 4:10, and wherein the weight ratio of [component a)]:[components a), b) and c) combined] is in the range 3.5:10 to 5.2:10, and wherein the tefluthrin, the C8-C16 aromatic hydrocarbon, and the surfactant system if present form a solution which is applied to the support.

2. The granular soil-applied insecticide according to claim 1, wherein the tefluthrin is present in the range of from 6.3 to 10.2 weight percent.

3. The granular soil-applied insecticide according to claim 1, wherein the weight ratio of [components a), b) and c) combined]:[component d)] is in the range of from 1.8:10 to 3.8:10.

4. The granular soil-applied insecticide according to claim 1, wherein the weight ratio of [component a)]:[components a), b) and c) combined] is in the range of from 3.6:10 to 5:10.

5. The granular soil-applied insecticide according to claim 1, wherein the granular support is granules comprised of montmorillonite clay.

6. The granular soil-applied insecticide according to claim 1, wherein tefluthrin is present in the range of from 6.3 to 6.7 weight percent.

7. The granular soil-applied insecticide according to claim 1, wherein tefluthrin is present in the range of from 9.8 to 10.2 weight percent.

8. The granular soil-applied insecticide according to claim 1, wherein the granular soil-applied insecticide comprises:
   a) from 6.3 to 6.7 weight percent of tefluthrin,
   b) from 8 to 12 weight percent of the C8-C16 aromatic hydrocarbon solvent for the tefluthrin,
   c) from 0 to 5 weight percent of the surfactant system, and
   d) the remainder comprising a montmorillonite clay granular support,
   wherein the weight ratio of [components a), b) and c) combined]:[component d)] is in the range of from 1.8:10 to 2.2:10, the weight ratio of [component a)]:[components a), b) and c) combined] is in the range of from 3.6:10 to 4.2:10, and wherein the weight ratio of [component a)]:[component b)] is in the range of from 6.3:10 to 6.7:10.

9. The granular soil-applied insecticide according to claim 1, wherein the granular soil-applied insecticide comprises:
   a) from 9.8 to 10.2 weight percent of tefluthrin,
   b) from 13 to 18 weight percent of the C8-C16 aromatic hydrocarbon solvent for the tefluthrin,
   c) from 0 to 5 weight percent of the surfactant system, and
   d) a montmorillonite clay granular support,
   wherein the weight ratio of [components a), b) and c) combined]:[component d)] is in the range of from 3.1:10 to 3.8:10, the weight ratio of [component a)]:[components a), b) and c) combined] is in the range of from 3.6:10 to 4.2:10, and wherein the weight ratio of [component a)]:[component b)] is in the range of from 6.3:10 to 6.7:10.

10. The granular soil-applied insecticide according to claim 1, wherein the granular soil-applied insecticide comprises:
    a) from 9.8 to 10.2 weight percent of tefluthrin,
    b) from 7 to 10 weight percent of the C8-C16 aromatic hydrocarbon solvent for the tefluthrin,
    c) from 2 to 4 weight percent of the surfactant system which comprises a polyaryl-phenyl ether phosphate, a polyethylene-polypropylene glycol monobutyl ether polymer having an average molecular weight in the range of 2400 Da to 3500 Da, and sodium lauryl sulphate, and
    d) a montmorillonite clay granular support,
    wherein the weight ratio of [components a), b) and c) combined]:[component d)] is in the range of from 2.5:10 to 2.9:10, and wherein the weight ratio of [component a)]:[components a), b) and c) combined] is in the range of from 4.6:10 to 5:10.

11. The granular soil-applied insecticide according to claim 8, wherein the granular soil-applied insecticide consists of:
 a) 6.5% w/w of tefluthrin;
 b) 10.07% w/w of C9-C10 aromatic hydrocarbon solvent for the tefluthrin; and
 d) 83.43% w/w of montmorillonite granules.

12. The granular soil-applied insecticide according to claim 9, wherein the granular soil-applied insecticide consists of:
 a) 10% w/w of tefluthrin;
 b) 15.5% w/w of C9-C10 aromatic hydrocarbon solvent for the tefluthrin; and
 d) 74.5% w/w of montmorillonite granules.

13. The granular soil-applied insecticide according to claim 10, wherein the granular soil-applied insecticide consists of:
 a) 10% w/w of tefluthrin;
 b) 8% w/w of C9-C10 aromatic hydrocarbon solvent for the tefluthrin;
 c) 1.33% w/w of polyaryl-phenyl ether phosphate, 0.67% w/w of a polyethylene-polypropylene glycol monobutyl ether polymer, 1% w/w of sodium lauryl sulphate; and
 d) 79% w/w of montmorillonite granules.

14. A method for controlling insects comprising applying the granular soil-applied insecticide according to claim 1 to a locus of said insects.

15. The method of claim 14, wherein the locus is soil for the growth of plants susceptible to attack by the insects.

16. The granular soil-applied insecticide according to claim 1, wherein the C8-C16 aromatic hydrocarbon solvent for the tefluthrin is a C9-C11 aromatic hydrocarbon solvent for the tefluthrin.

17. The granular soil-applied insecticide according to claim 1, wherein the C8-C16 aromatic hydrocarbon solvent for the tefluthrin is a C9-C10 aromatic hydrocarbon solvent for the tefluthrin.

18. A method of preparing a granular soil-applied insecticide, comprising:
 preparing a solution comprising tefluthrin, a mixture of aromatic hydrocarbons, and optionally a surfactant system; and
 spraying or aspirating the solution to a granular support to form the granular soil-applied insecticide;
 wherein the granular soil-applied insecticide comprises:
 a) from 6 to 12 weight percent of tefluthrin,
 b) from 7 to 18 weight percent of a C8-C16 aromatic hydrocarbon solvent for the tefluthrin,
 c) from 0 to 5 weight percent of a surfactant system, and
 d) the remainder comprising a granular support.

19. A granular soil-applied insecticide composition comprising:
 a) from 6 to 12 weight percent of tefluthrin,
 b) from 7 to 18 weight percent of a C8-C16 aromatic hydrocarbon solvent for the tefluthrin,
wherein the weight ratio of [component a)]:[components a), b) and c) combined] is in the range of from 3.5:10 to 5.2:10, and wherein the tefluthrin, the C8-C16 aromatic hydrocarbon, and the surfactant system if present form a solution which is sprayed or aspirated to the support.

20. The granular soil-applied insecticide of claim 19, wherein the granular support is granules comprised of montmorillonite clays.

21. The granular soil-applied insecticide of claim 19, wherein the granular soil-applied insecticide comprises 6.5 to 10 weight percent of tefluthrin, 10.1 to 15.5 weight percent of C9-C10 hydrocarbon for the tefluthrin and 74.5 to 83.4 weight percent of montmorillonite granules.

22. The method of claim 17, wherein the granular support is granules comprised of montmorillonite clays.

\* \* \* \* \*